United States Patent
Sato et al.

(10) Patent No.: US 10,815,575 B2
(45) Date of Patent: *Oct. 27, 2020

(54) ELECTROCHEMICAL REDUCTION DEVICE AND METHOD FOR MANUFACTURING HYDRIDE OF AROMATIC COMPOUND

(71) Applicant: JX Nippon Oil & Energy Corporation, Chiyoda-ku, Tokyo (JP)

(72) Inventors: Yasushi Sato, Tokyo (JP); Kota Miyoshi, Tokyo (JP); Kojiro Nakagawa, Tokyo (JP); Yoshihiro Kobori, Tokyo (JP)

(73) Assignee: ENEOS CORPORATION, Chiyoda-Ku, Tokyo (JP)

(*) Notice: Subject to any disclaimer, the term of this patent is extended or adjusted under 35 U.S.C. 154(b) by 252 days.

This patent is subject to a terminal disclaimer.

(21) Appl. No.: 14/864,069

(22) Filed: Sep. 24, 2015

(65) Prior Publication Data
US 2016/0010223 A1    Jan. 14, 2016

Related U.S. Application Data

(63) Continuation of application No. PCT/JP2014/001708, filed on Mar. 25, 2014.

(30) Foreign Application Priority Data

Mar. 29, 2013   (JP) .................. 2013-074108

(51) Int. Cl.
*C25B 3/04*   (2006.01)
*C25B 15/02*   (2006.01)
(Continued)

(52) U.S. Cl.
CPC .......... *C25B 3/04* (2013.01); *C25B 1/10* (2013.01); *C25B 9/08* (2013.01); *C25B 9/18* (2013.01);
(Continued)

(58) Field of Classification Search
CPC ......... C25B 15/02; C25B 13/04; C25B 13/00; C25B 9/10; C25B 9/08; C25B 3/04; C25B 1/10

See application file for complete search history.

(56) References Cited

U.S. PATENT DOCUMENTS

| | | | |
|---|---|---|---|
| 4,588,484 A | 5/1986 | Justice, Jr. et al. | |
| 6,174,419 B1* | 1/2001 | Akiyama | A61L 2/035 204/228.6 |

(Continued)

FOREIGN PATENT DOCUMENTS

| | | |
|---|---|---|
| CA | 2 841 008 A1 | 1/2013 |
| JP | 47-027975 | 10/1972 |

(Continued)

OTHER PUBLICATIONS

Montilla et al (Electrochemica Acta, vol. 45, issues 25-26, 2000, pp. 4271-4277) (Year: 2000).*

(Continued)

*Primary Examiner* — Alexander W Keeling
(74) *Attorney, Agent, or Firm* — Buchanan Ingersoll & Rooney PC (57) ABSTRACT

An electrochemical reduction device includes an electrode unit, a power control unit, an organic material storage tank, a concentration measurement unit, a water storage tank, a gas-water separation unit, and a control unit. The electrode unit includes an electrolyte membrane, a reduction electrode, and an oxygen evolving electrode. The control unit controls the power control unit so as to satisfy a relation of $V_{HER}-V_{allow} \leq V_{CA} \leq V_{TRR}$ when the potential at a reversible hydrogen electrode, the standard redox potential of the aromatic compound, and the potential of the reduction electrode are expressed as $V_{HER}$, $V_{TRR}$, and $V_{CA}$, respectively. $V_{allow}$ is adjusted according to the concentration of the aromatic compound measured by the concentration measurement unit.

12 Claims, 4 Drawing Sheets

(51) Int. Cl.
*C25B 9/08* (2006.01)
*C25B 9/18* (2006.01)
*C25B 11/04* (2006.01)
*C25B 1/10* (2006.01)
*C25B 13/04* (2006.01)

(52) U.S. Cl.
CPC ...... *C25B 11/0415* (2013.01); *C25B 11/0478* (2013.01); *C25B 13/04* (2013.01); *C25B 15/02* (2013.01); *Y02E 60/366* (2013.01)

(56) References Cited

U.S. PATENT DOCUMENTS

| | | | | |
|---|---|---|---|---|
| 6,203,675 | B1* | 3/2001 | Zimmerman | C25B 1/24 204/252 |
| 8,568,581 | B2* | 10/2013 | Sivasankar | C25B 3/00 205/413 |
| 2004/0007476 | A1* | 1/2004 | Tennakoon | A61L 2/186 205/343 |
| 2009/0000574 | A1 | 1/2009 | Sugimasa et al. | |
| 2009/0321265 | A1* | 12/2009 | Stancovski | B01D 53/32 205/83 |
| 2013/0105330 | A1* | 5/2013 | Teamey | C25B 1/00 205/349 |
| 2014/0144774 | A1 | 5/2014 | Hirashige et al. | |

FOREIGN PATENT DOCUMENTS

| | | |
|---|---|---|
| JP | 2003-045449 A | 2/2003 |
| JP | 2004-324190 A | 11/2004 |
| JP | 2005-126288 A | 5/2005 |
| JP | 2005-239479 A | 9/2005 |
| JP | 2009-007647 A | 1/2009 |
| NO | 2012/043086 A1 | 4/2012 |
| WO | 2011/122155 A1 | 10/2011 |
| WO | 2013/145782 A1 | 10/2013 |

OTHER PUBLICATIONS

Iupac (Reference Electrode, 1994). (Year: 1994).*
Chaplin ("Electrolysis of Water", Water Structure and Science, 2012, pp. 1-7).*
International Search Report (Form PCT/ISA/210) dated May 20, 2014, by the Japanese Patent Office in corresponding International Application No. PCT/JP2014/001708 with English translation thereof. (5 pgs).
International Preliminary Report on Patentability (Form PCT/IB/373) and Translation of Written Opinion of the International Searching Authority (Form PCT/ISA/237) dated Sep. 29, 2015, by the International Bureau of WIPO in corresponding International Application No. PCT/JP2014/001708. (8 pgs).
Ichikawa, M, "Novel Infra-Structured Technology of Hydrogen Transportation, Present Status and Future Problems", Japan Institute of Energy, vol. 85, No. 7, pp. 517-524, 2006.
Office Action (Communication pursuant to Article 94(3) EPC) dated Sep. 25, 2017 by the European Patent Office in corresponding European Patent Application No. 14 775 429.5. (4 pages).
Extended European Search Report dated Sep. 30, 2016, issued by the European Patent Office in corresponding European Application No. 14775429.5. (10 pages).
Yuan et al., "AC impedance technique in PEM fuel cell diagnosis—A review", International Journal of Hydrogen Energy, Nov. 29, 2007, vol. 32, No. 17, pp. 4365-4380.

* cited by examiner

ELECTROCHEMICAL REDUCTION DEVICE AND METHOD FOR MANUFACTURING HYDRIDE OF AROMATIC COMPOUND

BACKGROUND OF THE INVENTION

1. Field of the Invention

The present invention relates to a technique for electrochemically hydrogenating an aromatic hydrocarbon compound or a nitrogen-containing heterocyclic aromatic compound.

2. Description of the Related Art

It is known that a cyclic organic compound such as cyclohexane or decalin is efficiently obtained by hydrogenating a benzene ring of a corresponding aromatic hydrocarbon compound (benzene or naphthalene) using a hydrogen gas. This reaction requires reaction conditions of high temperature and high pressure, and thus is unsuitable for small to medium scale manufacturing a cyclic organic compound. On the other hand, in an electrochemical reaction using an electrolysis cell, it is not necessary to treat gaseous hydrogen since water can be used as a source of hydrogen, and also the reaction is known to proceed under relatively mild reaction conditions (at from room temperature to about 200° C. and under normal pressure).
[Patent document No. 1] JP 2003-045449
[Patent document No. 2] JP 2005-126288
[Patent document No. 3] JP 2005-239479
[non-patent document No. 1] Masaru Ichikawa, J. Jpn. Inst. Energy, vol. 85, 517 (2006)

As an example of electrochemically hydrogenating a benzene ring of an aromatic hydrocarbon compound such as toluene, a method has been reported in which toluene that is vaporized into a gaseous state is sent to the reduction electrode side to obtain methylcyclohexane, in which a benzene ring is hydrogenated, without going a state of a hydrogen gas, in a configuration similar to that of water electrolysis (see Masaru Ichikawa, J. Jpn. Inst. Energy, vol. 85, 517 (2006)). However, the amount of substance that can be transformed per electrode area or time (current density) is not large, and it has been difficult to industrially hydrogenate a benzene ring of an aromatic hydrocarbon compound.

SUMMARY OF THE INVENTION

The present invention has been devised in view of the problem described above, and an object thereof is to provide a technique capable of electrochemically hydrogenating a benzene ring of an aromatic hydrocarbon compound or a nitrogen-containing heterocyclic aromatic compound with high efficiency.

An aspect of the present invention is an electrochemical reduction device. The electrochemical reduction device includes: an electrode unit configured to include an electrolyte membrane having ionic conductivity, a reduction electrode that is provided on one side of the electrolyte membrane and that contains a reduction catalyst for hydrogenating at least one benzene ring of an aromatic compound, and an oxygen evolving electrode that is provided on the other side of the electrolyte membrane; a power control unit that applies a voltage Va between the reduction electrode and the oxygen evolving electrode; a concentration measurement unit that measures a concentration of an aromatic compound to be supplied to the reduction electrode; a control unit that controls the power control unit so as to satisfy a relation of $V_{HER}-V_{allow} \leq V_{CA} \leq V_{TRR}$ when the potential at a reversible hydrogen electrode, the standard redox potential of the aromatic compound, the potential of the reduction electrode, and the potential difference for setting the lower limit potential used for determining the lower limit acceptable potential of the potential $V_{CA}$ are expressed as $V_{HER}$, $V_{TRR}$, $V_{CA}$, and $V_{allow}$, respectively; and a lower limit potential setting unit that determines a lower limit of the potential $V_{CA}$ by adjusting the potential difference $V_{allow}$ for setting the lower limit potential according to the concentration of the aromatic compound measured by the concentration measurement unit.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

An aspect of the present invention is an electrochemical reduction device. The electrochemical reduction device includes: an electrode unit configured to include an electrolyte membrane having ionic conductivity, a reduction electrode that is provided on one side of the electrolyte membrane and that contains a reduction catalyst for hydrogenating at least one benzene ring of an aromatic compound, and an oxygen evolving electrode that is provided on the other side of the electrolyte membrane; a power control unit that applies a voltage Va between the reduction electrode and the oxygen evolving electrode; a concentration measurement unit that measures a concentration of an aromatic compound to be supplied to the reduction electrode; a control unit that controls the power control unit so as to satisfy a relation of $V_{HER}-V_{allow} \leq V_{CA} \leq V_{TRR}$ when the potential at a reversible hydrogen electrode, the standard redox potential of the aromatic compound, the potential of the reduction electrode, and the potential difference for setting the lower limit potential used for determining the lower limit acceptable potential of the potential $V_{CA}$ are expressed as $V_{HER}$, $V_{TRR}$, $V_{CA}$, and $V_{allow}$, respectively; and a lower limit potential setting unit that determines a lower limit of the potential $V_{CA}$ by adjusting the potential difference $V_{allow}$ for setting the lower limit potential according to the concentration of the aromatic compound measured by the concentration measurement unit.

For the electrochemical reduction device of the above-described aspect, the lower limit potential setting unit may increase the absolute value of the potential difference $V_{allow}$ for setting the lower limit potential when the concentration of the aromatic compound is decreased. The control unit may further include: a reference electrode that is arranged to be in contact with the electrolyte membrane and to be electrically isolated from the reduction electrode and the oxygen evolving electrode and that is held at a reference electrode potential $V_{Ref}$; and a voltage detection unit that detects a potential difference $\Delta V_{CA}$ between the reference electrode and the reduction electrode, and may acquire the potential $V_{CA}$ of the reduction electrode based on the potential difference $\Delta V_{CA}$ and the reference electrode potential $V_{Ref}$. The control unit may change a voltage Va, and thus may control the potential $V_{CA}$ of the reduction electrode to be the potential in a predetermined range. The control unit may control the power control unit so as to satisfy Va≥ $(V_{OER}-V_{CA})$ when the oxygen evolving equilibrium potential in the electrolysis of water is expressed as $V_{OER}$. In addition, the reference electrode may be arranged on the side that is provided with the reduction electrode on the electrolyte membrane.

Another aspect of the present invention is an electrochemical reduction device. The electrochemical reduction device includes: plurality of electrode units configured to include an electrolyte membrane having ionic conductivity, a reduction electrode that is provided on one side of the electrolyte membrane and that contains a reduction catalyst for hydrogenating at least one benzene ring of an aromatic compound, and an oxygen evolving electrode that is provided on the other side of the electrolyte membrane; a power control unit that applies a voltage Va (i) (here, i is a sign for distinguishing individual electrode units, and the same as the following) between the oxygen evolving electrode and the reduction electrode of each of the electrode units; a raw material supply device to allow the aromatic compound to be passed through the reduction electrodes of the respective the electrode units in order; a concentration measurement unit that measures a concentration M (i) of an aromatic compound to be supplied to the reduction electrode of each of the electrode units; a control unit that controls the power control unit so as to satisfy a relation of $V_{HER}-V_{allow}(i) \leq V_{CA} \leq V_{TRR}$ when the potential at a reversible hydrogen electrode, the standard redox potential of the aromatic compound, the potential of the reduction electrode, and the potential difference for setting the lower limit potential used for determining the lower limit acceptable potential of the potential $V_{CA}$ are expressed as $V_{HER}$, $V_{TRR}$, $V_{CA}$, and $V_{allow}$ (i), respectively; and a lower limit potential setting unit that determines a lower limit of the potential $V_{CA}$ by adjusting the potential difference $V_{allow}$ (i) for setting the lower limit potential according to the concentration of the aromatic compound measured by the concentration measurement unit, in which when until a concentration M (i) reaches a concentration lower limit value that is set for each of electrode units, the hydrogenation of at least one benzene ring of the aromatic compound is proceeded in each of the electrode units to make the concentration M (i) to be the concentration lower limit value that is set for each of the electrode units, the aromatic compound is transferred to the electrode units of the downstream side to be subjected to each of hydrogenations.

For the electrochemical reduction device of the above-described aspect, the lower limit potential setting unit may increase the absolute value of the potential difference $V_{allow}$ (i) for setting the lower limit potential when the concentration of the aromatic compound is decreased. The control unit may further include: a plurality of reference electrodes that are arranged to be in contact with the electrolyte membrane of each of electrolysis layers included in the plural electrode units and to be electrically isolated from the reduction electrode and the oxygen evolving electrode; and a voltage detection unit that detects a potential difference $\Delta V_{CA}$ (i) between the reference electrode and the reduction electrode, and may acquire the potential $V_{CA}$ (i) of the reduction electrode based on the potential difference $\Delta V_{CA}$ (i) and the reference electrode potential $V_{Ref}$ (i). The control unit may change the voltage Va (i), and thus control the potential $V_{CA}$ (i) of the reduction electrode of each of the electrode units to be the potential in a predetermined range. The control unit may control the power control unit so as to satisfy Va (i)≥$(V_{OER}-V_{CA})$ when the oxygen evolving equilibrium potential in the electrolysis of water is expressed as $V_{OER}$. The reference electrode may be arranged on the side that is provided with the reduction electrode in the electrolysis membrane.

Another aspect of the present invention is a method for manufacturing a hydride of an aromatic compound. The manufacturing method includes introducing an aromatic compound to the reduction electrode side of the electrode unit, circulating water or a humidified gas to the oxygen evolving electrode side, and hydrogenating at least one benzene ring of the aromatic compound introduced to the reduction electrode side, by using the electrochemical reduction device of any one of the above-described aspects. In this aspect, the aromatic compound to be introduced to the reduction electrode side may be introduced to the reduction electrode side in a liquid state at a reaction temperature.

Combinations of the above-described elements will also be within the scope of the present invention sought to be patented by the present patent application.

Hereinafter, embodiments of the invention will now be described by reference to the drawings. In the figures, like numerals represent like constituting elements and the description thereof will not be appropriately provided.

Embodiment 1

Figure 1:
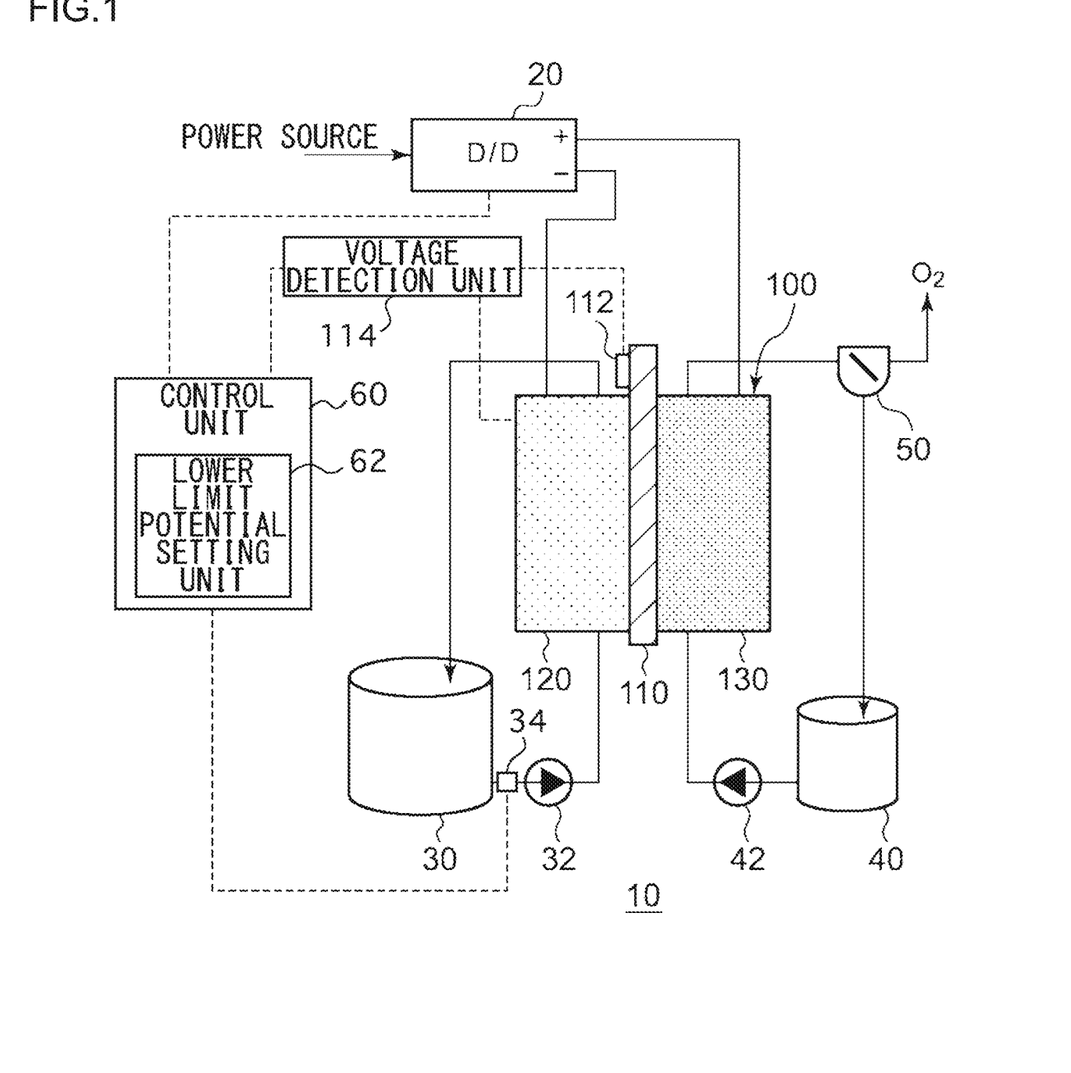
FIG. 1 is a schematic diagram illustrating the general configuration of an electrochemical reduction device according to an embodiment 1.
Figure 2:
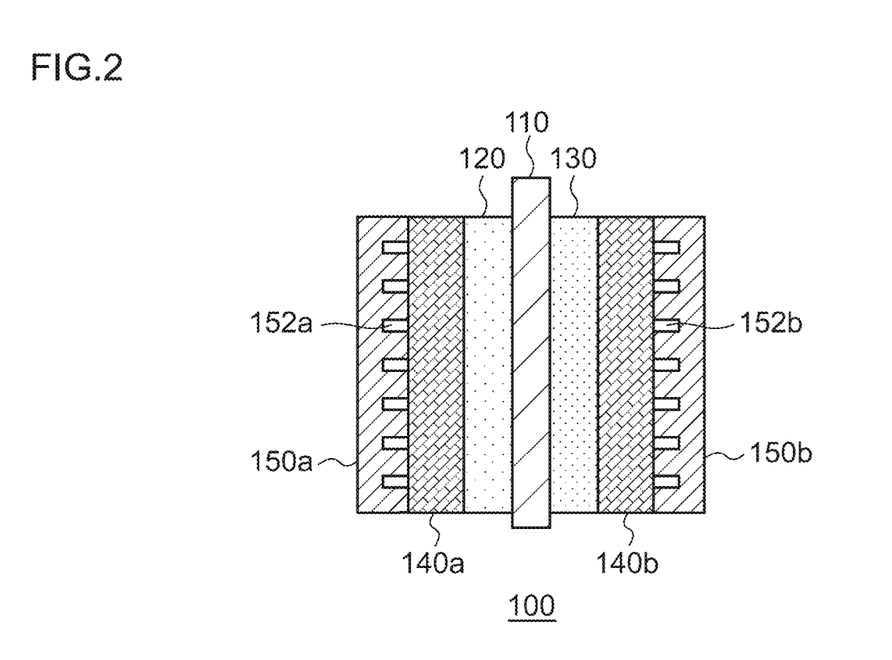
FIG. 2 is a diagram illustrating the general configuration of an electrode unit of the electrochemical reduction device according to the embodiment 1.

FIG. 1 is a schematic diagram illustrating the general configuration of an electrochemical reduction device 10 according to an embodiment. FIG. 2 is a diagram illustrating the general configuration of an electrode unit of the electrochemical reduction device 10 according to the embodiment. As illustrated in FIG. 1, the electrochemical reduction device 10 includes an electrode unit 100, a power control unit 20, an organic material storage tank 30, a concentration measurement unit 34, a water storage tank 40, a gas-water separation unit 50, and a control unit 60, as a main configuration. As illustrated in FIG. 2, the electrode unit 100 includes an electrolyte membrane 110, a reduction electrode 120, an oxygen evolving electrode 130, liquid diffusion layers 140a and 140b, and separators 150a and 150b. Hereinafter, the combination of the electrolyte membrane 110, the reduction electrode 120, the oxygen evolving electrode 130, the liquid diffusion layers 140a and 140b, and the separators 150a and 150b is called a "cell".

The power control unit 20 is, for example, a DC/DC converter for converting the output voltage of a power source into a predetermined voltage. The positive electrode output terminal of the power control unit 20 is connected to the oxygen evolving electrode (positive electrode) 130 of the electrode unit 100. The negative electrode output terminal of the power control unit 20 is connected to the reduction electrode (negative electrode) 120 of the electrode unit 100. With this configuration, a predetermined voltage is applied between the oxygen evolving electrode 130 and the reduction electrode 120 of the electrode unit 100. In addition, a reference electrode input terminal of the power control unit 20 is connected to a reference electrode 112 provided on an electrolyte membrane 110 that is described later. The outputs of the positive electrode output terminal and the negative electrode output terminal of the power control unit 20 are controlled by the control unit 60 to be the desired potentials of the oxygen evolving electrode 130 and the reduction electrode 120 based on the potential of the reference electrode 112. As the power source, electrical power derived from natural energy such as sunlight and wind power can be used. The mode of potential control of the positive electrode output terminal and the negative electrode output terminal by the control unit 60 will be described later.

The organic material storage tank 30 stores organic materials including an aromatic compound. The aromatic compound used in the present embodiment is an aromatic hydrocarbon compound or a nitrogen-containing heterocyclic aromatic compound, which contains at least one aromatic ring, and examples thereof include benzene, naphthalene, anthracene, diphenylethane, pyridine, pyrimidine, pyrazine, quinoline, isoquinoline, N-alkylpyrrole, N-alkylindole, N-alkyldibenzopyrrole and the like. 1 to 4 hydrogen atoms of the aromatic ring of the aromatic hydrocarbon or nitrogen-containing heterocyclic aromatic compound described above may be substituted by an alkyl groups. It is to be noted that the "alkyl" of the aromatic compound is a linear or branched alkyl group having 1 to 6 carbon atoms. For example, alkylbenzenes include toluene, ethyl benzene and the like, dialkylbenzenes include xylene, diethylbenzene and the like, and trialkylbenzenes include mesitylene and the like. Alkylnaphthalenes include methylnaphthalene and the like. The aromatic ring of the aromatic hydrocarbon or nitrogen-containing heterocyclic aromatic compound described above may have 1 to 3 substituents. In the specification to be described below, the aromatic hydrocarbon compound and the nitrogen-containing heterocyclic aromatic compound used in the present invention are referred to as "aromatic compounds" in some cases. The aromatic compound is preferably a liquid at room temperature. When a mixture of two or more of the above-described aromatic compounds is used, the mixture should be a liquid. Consequently, the aromatic compound can be supplied to the electrode unit 100 in a liquid state without performing processes such as heating and pressurizing, so that the configuration of the electrochemical reduction device 10 can be simplified. When the aromatic compound is a liquid, with the viewpoint of the electrode reaction performed in the electrode unit 100 to be a practical level, the concentration of the aromatic compound in an organic liquid including the aromatic compound is 0.1% or more, preferably 0.3% or more, and more preferably 0.5% or more.

The aromatic compound stored in the organic material storage tank 30 is supplied to the reduction electrode 120 of the electrode unit 100 by a first liquid supply device 32. For the first liquid supply device 32, for example, various types of pumps such as a gear pump or a cylinder pump, or a gravity flow device or the like can be used. Instead of the aromatic compound, an N-substitution product of the above-described aromatic compound may be used. A circulation pathway is provided between the organic material storage tank 30 and the reduction electrode 120 of the electrode unit 100. The organic liquid including a benzene ring of an aromatic compound that is hydrogenated by the electrode unit 100 and an unreacted aromatic compound passes through the circulation pathway and is stored in the organic material storage tank 30. No gas is generated by a major reaction that proceeds at the reduction electrode 120 of the electrode unit 100, but when gas is additionally generated, a gas-liquid separation device may be provided in the middle of the circulation pathway.

The concentration measurement unit 34 measures the concentration of the aromatic compound in the organic liquid to be supplied to the reduction electrode 120 of the electrode unit 100. The concentration of the aromatic compound measured by the concentration measurement unit 34 is sent to the control unit 60. In this embodiment, the concentration measurement unit 34 is provided on the front of the reduction electrode 120 of the electrode unit 100 (in this embodiment, between the first liquid supply device 32 and the organic material storage tank 30), but may be provided on everywhere in the circulation pathway of the aromatic compound. When the concentration measurement unit 34 is provided on the front of the reduction electrode 120 of the electrode unit 100, from then on, the concentration of the aromatic compound to be treated in the electrode unit 100 is measured. When the concentration measurement unit 34 is provided on the outlet side of the reduction electrode 120 of the electrode unit 100, since the aromatic compound is consumed as much as the quantity of electricity flowing through the reduction electrode 120 of the electrode unit 100, the concentration of the aromatic compound in the organic liquid to be supplied to the reduction electrode 120 of the electrode unit 100 can be obtained through the revision to add the quantity of the consumption to the measured concentration.

As the concentration measurement unit 34, there may be a method for measuring in real time a concentration of an aromatic compound by an optical detective device, or a device to sense a change of dielectric constant, and a method for measuring in non-real time a concentration of an aromatic compound.

As the optical detective device, there may be a method using a difference between the optical properties of an aromatic compound as a raw material and a hydrogen adduct as a product. For example, in general, an aromatic compound has a strong absorption region at an UV region (254 nm). Therefore, the concentration of an aromatic compound can be calculated from a predetermined calibration curve by calculating absorbance from the intensity of light transmitted by the irradiation of the light with the wavelength near the UV region. For this object, it is preferable that a part of the pipeline be nearly transparent at a measurement wavelength in order to use part of the pipeline for supplying or circulating the aromatic compound for the corresponding optical detection. In addition to the UV absorption, for example, a method for converting a refractive index obtained by measuring a refractive index of an organic liquid circulating the pipeline into the concentration of an aromatic compound may be used.

As the device to accurately calculate a concentration of an aromatic compound in non-real time, a method using an analyzer such as a gas chromatography (GC), a liquid chromatography (LC), and a mass spectrum (MS) may be used. The concentration of the aromatic compound can be measured by measuring the aromatic compound using such an analyzer after sampling the organic liquid from the inside of a pipeline for supplying the aromatic compound to the reduction electrode 120 or an organic material storage tank 30. In this case, an auto-sampler may be used for sampling an organic liquid from the inside of the pipeline or the organic material storage tank 30 on a regular cycle. In addition, GC and LC may be used with MS.

The water storage tank 40 stores ion-exchanged water, purified water, and the like (hereinafter, simply referred to as "water"). Water stored in the water storage tank 40 is supplied to the oxygen evolving electrode 130 of the electrode unit 100 by a second liquid supply device 42. For the second liquid supply device 42, for example, various types of pumps such as a gear pump or a cylinder pump or a gravity flow device or the like can be used as in the case of the first liquid supply device 32. A circulation pathway is provided between the water storage tank 40 and the oxygen evolving electrode of the electrode unit 100, and water that is unreacted in the electrode unit 100 passes through the circulation pathway and is stored in the water storage tank 40. The gas-water separation unit 50 is provided in the middle of a pathway where unreacted water is sent back to the water storage tank 40 from the electrode unit 100. By the gas-water separation unit 50, oxygen evolved by the electrolysis of water in the electrode unit 100 is separated from water and discharged to outside the system.

The cell that comprises the electrode unit 100 may be one or more. When the electrode unit 100 is comprised by a plurality of cells, voltage applied between the positive electrode output terminal and negative electrode output terminal of the power control unit 20 may be determined so that the desired voltage Va is applied to each cell. In FIG. 1, the electrode unit 100 is simplified for illustration, and liquid diffusion layers 140a and 140b and separators 150a and 150b are not illustrated.

The electrolyte membrane 110 is formed of a material (ionomer) having protonic conductivity, and inhibits substances from getting mixed or being diffused between the reduction electrode 120 and the oxygen evolving electrode 130 while selectively conducting protons. The thickness of the electrolyte membrane 110 is preferably from 5 to 300 µm, more preferably from 10 to 150 µm, and most preferably from 20 to 100 µm. If the thickness of the electrolyte membrane 110 is less than 5 µm, the barrier property of the electrolyte membrane 110 is deteriorated, so that cross-leaking easily occurs. If the thickness of the electrolyte membrane 110 is more than 300 µm, ion transfer resistance becomes too large, and thus the thickness of more than 300 µm is not preferred.

The area specific resistance, that is, ion transfer resistance per geometric area, of the electrolyte membrane 110 is preferably 2000 mΩ·cm$^2$ or less, more preferably 1000 mΩ·cm$^2$ or less, and most preferably 500 mΩ·cm$^2$ or less. If the area specific resistance of the electrolyte membrane 110 is more than 2000 mΩ·cm$^2$, protonic conductivity becomes insufficient. Examples of the material having protonic conductivity (which is a cation-exchanging ionomer) include perfluorosulfonic acid polymers such as Nafion (registered trademark) and Flemion (registered trademark). The ion exchange capacity (IEC) of the cation-exchanging ionomer is preferably from 0.7 to 2 meq/g, and more preferably from 1 to 1.2 meq/g. If the ion exchange capacity of the cation-exchanging ionomer is less than 0.7 meq/g, ionic conductivity becomes insufficient. On the other hand, if the ion exchange capacity of the cation-exchanging ionomer is more than 2 meq/g, the solubility of the ionomer in water is increased, so that the strength of the electrolyte membrane 110 becomes insufficient.

On the electrolyte membrane 110, a reference electrode 112 is provided in an area spaced apart from the reduction electrode 120 and the oxygen evolving electrode 130 in such a manner that the reference electrode 112 is in contact with the electrolyte membrane 110. In other words, the reference electrode 112 is electrically isolated from the reduction electrode 120 and the oxygen evolving electrode 130. The reference electrode 112 is held at a reference electrode potential $V_{Ref}$. Examples of the reference electrode 112 include a standard hydrogen reduction electrode (reference electrode potential $V_{Ref}$=0 V) and an Ag/AgCl electrode (reference electrode potential $V_{Ref}$=0.199V), but the reference electrode 112 is not limited thereto. The reference electrode 112 is preferably provided on the surface of the electrolyte membrane 110 on the reduction electrode 120 side.

A potential difference $\Delta V_{CA}$ between the reference electrode 112 and the reduction electrode 120 is detected by a voltage detection unit 114. The value of the potential difference $\Delta V_{CA}$ detected by the voltage detection unit 114 is input to the control unit 60.

The reduction electrode 120 is provided on one side of the electrolyte membrane 110. The reduction electrode 120 is a reduction electrode catalyst layer containing a reduction catalyst for hydrogenating a benzene ring of an aromatic compound. A reduction catalyst used for the reduction electrode 120 is not particularly limited, but includes, for example, at least one of Pt and Pd. In addition, the reduction catalyst may be composed of a metal composition which contains a first catalyst metal (noble metal) containing at least one of Pt and Pd, and one or two or more second catalyst metals selected from Cr, Mn, Fe, Co, Ni, Cu, Zn, Mo, Ru, Sn, W, Re, Pb, and Bi. In this case, the form of the metal composition is an alloy of the first catalyst metal and the second catalyst metal, or an intermetallic compound composed of the first catalyst metal and the second catalyst metal. The ratio of the first catalyst metal to the total mass of the first catalyst metal and the second catalyst metal is preferably from 10 to 95 wt %, more preferably from 20 to 90 wt %, and most preferably from 25 to 80 wt %. If the ratio of the first catalyst metal is less than 10 wt %, durability may be deteriorated from the perspective of resistance to dissolving or the like. On the other hand, if the ratio of the first catalyst metal is more than 95 wt %, the properties of the reduction catalyst become closer to those of a noble metal alone, and therefore the electrode activity becomes insufficient. In the following explanation, the first catalyst metal and the second catalyst metal are collectively referred to as "catalyst metals" in some cases.

The above-described catalyst metals may be supported by a conductive material (support). The electrical conductivity of the conductive material is preferably 1.0×10$^{-2}$ S/cm or more, more preferably 3.0×10$^{-2}$ S/cm or more, and most preferably 1.0×10$^{-1}$ S/cm or more. If the electrical conductivity of the conductive material is less than 1.0—10$^{-2}$ S/cm, sufficient conductivity cannot be imparted. Examples of the conductive material include conductive materials containing any one of a porous carbon, a porous metal, and a porous metal oxide as a major component. Examples of the porous carbon include carbon black such as Ketjenblack (registered trademark), acetylene black, and Vulcan (registered trademark). The BET specific surface area of the porous carbon measured by a nitrogen adsorption method is preferably 100 m$^2$/g or more, more preferably 150 m$^2$/g or more, and most preferably 200 m$^2$/g or more. If the BET specific surface area of the porous carbon is less than 100 m$^2$/g, it is difficult to uniformly support the catalyst metals. Therefore, the rate of utilization of a catalyst metal surface is lowered, causing catalyst performance to be degraded. Examples of the porous metal include Pt black, Pd black, a Pt metal deposited in a fractal shape, and the like. Examples of the porous metal oxide include oxides of Ti, Zr, Nb, Mo, Hf, Ta and W. In addition, examples of the porous conductive material for supporting a catalyst metal include nitrides, carbides, oxynitrides, carbonitrides, partially-oxidized carbonitrides of metals such as Ti, Zr, Nb, Mo, Hf, Ta, and W (hereinafter, they are collectively referred to as porous metal carbonitrides and the like). The BET specific surface areas of the porous metal, the porous metal oxide, the porous metal carbonitrides and the like measured by a nitrogen adsorption method are preferably 1 m²/g or more, more preferably 3 m²/g or more, and most preferably 10 m²/g or more. If the respective BET specific surface areas of the porous metal, the porous metal oxide, the porous metal carbonitrides and the like is less than 1 m²/g, it is difficult to uniformly support the catalyst metals. Therefore, the rate of utilization of a catalyst metal surface is lowered, causing catalyst performance to be degraded.

Depending on the type and composition of the first catalyst metal and the second catalyst metal, a simultaneous impregnation method in which the support is impregnated with the first catalyst metal and the second catalyst metal at the same time, or a sequential impregnation method in which the support is impregnated with the first catalyst metal, followed by impregnating the support with the second catalyst metal can be employed as a method for supporting the catalyst metals on the support. In the case of the sequential impregnation method, after the first catalyst metal is supported on the support, a heat treatment or the like may be performed once, followed by supporting the second catalyst metal on the support. After the impregnation of both the first catalyst metal and the second catalyst metal is completed, the first catalyst metal and the second catalyst metal are alloyed with each other or an intermetallic compound composed of the first catalyst metal and the second catalyst metal is formed by a heat treatment process.

To the reduction electrode 120, a material having conductivity, such as the aforementioned conductive oxide or carbon black may be added in addition to a conductive compound on which a catalyst metal is supported. Consequently, the number of electron-conducting paths among reduction catalyst particles can be increased, and thus resistance per geometric area of a reduction catalyst layer can be lowered in some cases.

The reduction electrode 120 may contain, as an additive, a fluorine-based resin such as polytetrafluoroethylene (PTFE).

The reduction electrode 120 may contain an ionomer having protonic conductivity. The reduction electrode 120 preferably contains ionically conducting materials (ionomers) having a structure that is identical or similar to that of the above-described electrolyte membrane 110 in a predetermined mass ratio. This allows the ionic conductivity of the reduction electrode 120 to be improved. In particular, in the case where a catalyst support is porous, the reduction electrode 120 makes a significant contribution to the improvement of the ionic conductivity by containing an ionomer that has protonic conductivity. Examples of the ionomer having protonic conductivity (which is a cation-exchanging ionomer) include perfluorosulfonic acid polymers such as Nafion (registered trademark) and Flemion (registered trademark). The ion exchange capacity (IEC) of the cation-exchanging ionomer is preferably from 0.7 to 3 meq/g, more preferably from 1 to 2.5 meq/g, and most preferably from 1.2 to 2 meq/g. When the catalyst metal is supported on porous carbon (carbon support), a mass ratio I/C of the cation-exchanging ionomer (I) to the carbon support (C) is preferably from 0.1 to 2, more preferably from 0.2 to 1.5, and most preferably from 0.3 to 1.1. It is difficult to obtain sufficient ionic conductivity if the mass ratio I/C is less than 0.1. On the other hand, if the mass ratio I/C is more than 2, the thickness of an ionomer coating over the catalyst metal is increased to inhibit the aromatic compound as a reactant from contacting a catalyst-active site, or the electron conductivity is decreased to reduce the electrode activity.

Preferably, the ionomer contained in the reduction electrode 120 partially covers a reduction catalyst. This allows three elements (an aromatic compound, a proton, and an electron), which are necessary for an electrochemical reaction at the reduction electrode 120, to be efficiently supplied to a reaction field.

The liquid diffusion layer 140a is laminated on the surface of the reduction electrode 120 on a side opposite to the electrolyte membrane 110. The liquid diffusion layer 140a plays a function of uniformly diffusing, to the reduction electrode 120, a liquid aromatic compound supplied from the separator 150a that is described later. As the liquid diffusion layer 140a, for example, carbon paper or carbon cloth is used.

The separator 150a is laminated on the surface of the liquid diffusion layer 140a on aside opposite to the electrolyte membrane 110. The separator 150a is formed of a carbon resin, or an anticorrosion alloy of Cr—Ni—Fe, Cr—Ni—Mo—Fe, Cr—Mo—Nb—Ni, Cr—Mo—Fe—W—Ni or the like. One or more groove-like flow channels 152a are provided on the surface of the separator 150a on the liquid diffusion layer 140a side. The liquid aromatic compound supplied from the organic material storage tank 30 circulates through the flow channel 152a, and the liquid aromatic compound penetrates into the liquid diffusion layer 140a from the flow channel 152a. The form of the flow channel 152a is not particularly limited, but for example, a straight flow channel or a serpentine flow channel can be employed. When a metal material is used for the separator 150a, the separator 150a may be a structure formed by sintering a sphere-like or pellet-like metal fine powder.

The oxygen evolving electrode 130 is provided on the other side of the electrolyte membrane 110. As the oxygen evolving electrode 130, one that contains a catalyst based on a noble metal oxide such as $RuO_2$ or $IrO_2$ is suitably used. These catalysts may be supported in a dispersed manner or coated on a metal substrate such as a metal wire or mesh of metals such as Cr, Mn, Fe, Co, Ni, Cu, Zn, Nb, Mo, Ta, and W or of alloys composed primarily of these metals. In particular, since $IrO_2$ is expensive, manufacturing costs can be lowered by coating the metal substrate with a thin film when $IrO_2$ is used as a catalyst.

The liquid diffusion layer 140b is laminated on the surface of the oxygen evolving electrode 130 on a side opposite to the electrolyte membrane 110. The liquid diffusion layer 140b plays a function of uniformly diffusing, to the oxygen evolving electrode 130, water supplied from the separator 150b that is described later. As the liquid diffusion layer 140b, for example, carbon paper or carbon cloth is used.

The separator 150b is laminated on the surface of the liquid diffusion layer 140b on aside opposite to the electrolyte membrane 110. The separator 150b is formed of an anticorrosion alloy of Cr/Ni/Fe, Cr/Ni/Mo/Fe, Cr/Mo/Nb/Ni, Cr/Mo/Fe/W/Ni, or the like or of a material formed by coating the surfaces of these metals with an oxide layer. One or more groove-like flow channels 152b are provided on the surface of the separator 150b on the liquid diffusion layer 140b side. Water supplied from the water storage tank 40 circulates through the flow channel 152b, and the water penetrates into the liquid diffusion layer 140b from the flow channel 152b. The form of the flow channel 152b is not particularly limited, but for example, a straight flow channel or a serpentine flow channel can be employed. When a metal material is used for the separator 150b, the separator 150b may be a structure formed by sintering a sphere-like or pellet-like metal fine powder.

In the present embodiment, liquid water is supplied to the oxygen evolving electrode 130, but a humidified gas (for example, air) may be used in place of the liquid water. In this case, the dew-point temperature of the humidified gas is preferably from room temperature to 100° C., and more preferably from 50 to 100° C.

When toluene is used as the aromatic compound, reactions in the electrode unit 100 are as follows.

<Electrode Reaction at Oxygen Evolving Electrode>

$3H_2O \rightarrow 1.5O_2 + 6H^+ + 6e^- : E_0 = 1.23$ V

<Electrode Reaction at Reduction Electrode> toluene+$6H^+$+$6e \rightarrow$methylcyclohexane:$E_0$=0.153 V
(vs RHE)

In other words, the electrode reaction at the oxygen evolving electrode and the electrode reaction at the reduction electrode proceeds in parallel, and protons evolved by electrolysis of water are supplied to the reduction electrode via the electrolyte membrane 110 in the electrode reaction at the oxygen evolving electrode, and used for hydrogenation of at least one benzene ring of the aromatic compound in the electrode reaction at the reduction electrode.

Referring back to FIG. 1, the control unit 60 controls the power control unit 20 so as to satisfy a relation of $V_{HER}$−$V_{allow} \leq V_{CA} \leq V_{TRR}$ when the potential at a reversible hydrogen electrode, the standard redox potential of the aromatic compound, and the potential of the reduction electrode 120 are expressed as $V_{HER}$, $V_{TRR}$, and $V_{CA}$, respectively. Here, $V_{allow}$ is a value (referred to as the potential difference for setting the lower limit potential) used for determining the lower limit acceptable potential of the potential $V_{CA}$. If the potential $V_{CA}$ is lower than $V_{HER}$−$V_{allow}$, competition with a hydrogen generation reaction occurs, and the reduction selectivity of the aromatic compound becomes insufficient, and thus the potential $V_{CA}$ lower than $V_{HER}$−$V_{allow}$ is not preferred. On the other hand, if the potential $V_{CA}$ is higher than the standard redox potential $V_{TRR}$, the hydrogenation of at least one benzene ring of the aromatic compound is not proceeded in a sufficient reaction rate in practical use, and thus the potential $V_{CA}$ higher than the standard redox potential $V_{TRR}$ is not preferred. In other words, by setting the potential $V_{CA}$ within the range that satisfies the above-described relation expression, an electrochemical reaction can be made to proceed at both the electrodes and the hydrogenation of at least one benzene ring of the aromatic compounds can be industrially practiced.

The inventors found that as the concentration of the aromatic compound to be supplied to the reduction electrode 120 is decreased with the progress of the hydrogenation of at least one benzene ring of the aromatic compounds, the lower limit acceptable potential of the potential $V_{CA}$ is shifted to the lower potential side. Based on this knowledge, a method of adjusting the lower limit acceptable potential of the potential $V_{CA}$ will be described.

The control unit 60 has a lower limit potential setting unit 62 for determining the lower limit of the potential $V_{CA}$ by adjusting the potential difference $V_{allow}$ for setting the lower limit potential according to the concentration of the aromatic compound measured by the concentration measurement unit 34. Specifically, when the concentration of the aromatic compound is decreased as the hydrogenation of at least one benzene ring of the aromatic compound progresses, an absolute value of the potential difference $V_{allow}$ for setting the lower potential is increased. Specifically, the control unit 60 increases the potential difference $V_{allow}$ for setting the lower limit potential within the concentration range of the aromatic compound. For such a control, when the amount of the hydrogen generation exceeds a predetermined value, the control such as a change of the current density may be again performed. In the situation in which the current density can be controlled in an almost constant state, the potential difference $V_{allow}$ for setting the lower limit potential may be continuously or gradationally increased. In addition, when the potential difference $V_{allow}$ for setting the lower limit potential is continually increased, the potential difference $V_{allow}$ for setting the lower limit potential may be linearly increased according to the change of the logarithm concentration of the aromatic compounds.

The control unit 60 controls the power control unit 20 so as to satisfy Va≥($V_{OER}$−$V_{CA}$) when the oxygen evolving equilibrium potential in the electrolysis of water is expressed as $V_{OER}$. In this way, the potential $V_{AN}$ of the oxygen evolving electrode 130 is held to be equal to or higher than the oxygen evolving equilibrium potential $V_{OER}$.

In addition, the following reaction conditions are used for the hydrogenation of at least one benzene ring of the aromatic compound using the electrochemical reduction device 10. The temperature of the electrode unit 100 is preferably from room temperature to 100° C., and more preferably from 40 to 80° C. If the temperature of the electrode unit 100 is lower than room temperature, the proceeding of the electrolytic reaction may be slowed down, or an enormous amount of energy is required to remove heat generated as the reaction proceeds, and thus the temperature lower than room temperature is not preferred. On the other hand, if the temperature of the electrode unit 100 is higher than 100° C., water is brought to a boil at the oxygen evolving electrode 130 and the vapor pressure of an organic material is increased at the reduction electrode 120, and thus the temperature higher than 100° C. is not preferred for the electrochemical reduction device 10 in which reactions of the both electrodes are performed in a liquid phase. The reduction electrode potential $V_{CA}$ is a true electrode potential, and thus may be different from a potential $V_{CA\_actual}$ that is actually measured. If there are resistance components, among various resistance components that exist in an electrolytic tank used in the embodiment, that correspond to ohmic resistance, a resistance value per electrode area of the entirety of these components is set to be the entire ohmic resistance $R_{ohmic}$ and the true electrode potential $V_{CA}$ is calculated in accordance with the following expression.

$V_{CA} = V_{CA\_actual} + R_{ohmic} \times J$ (current density)

Examples of the ohmic resistance include proton transfer resistance of the electrolyte membrane, electron transfer resistance of the electrode catalyst layer, and, furthermore, contact resistance on an electric circuit.

Here, $R_{ohmic}$ can be determined as an actual resistance component on an equivalent circuit by using an alternating-current impedance measurement or an alternating-current resistance measurement at a fixed frequency, but once the configuration of an electrolytic tank and a material system to be used are determined, a method may also be used in which $R_{ohmic}$ is used in the following control while $R_{ohmic}$ is considered as an almost stationary value.

Figure 3:
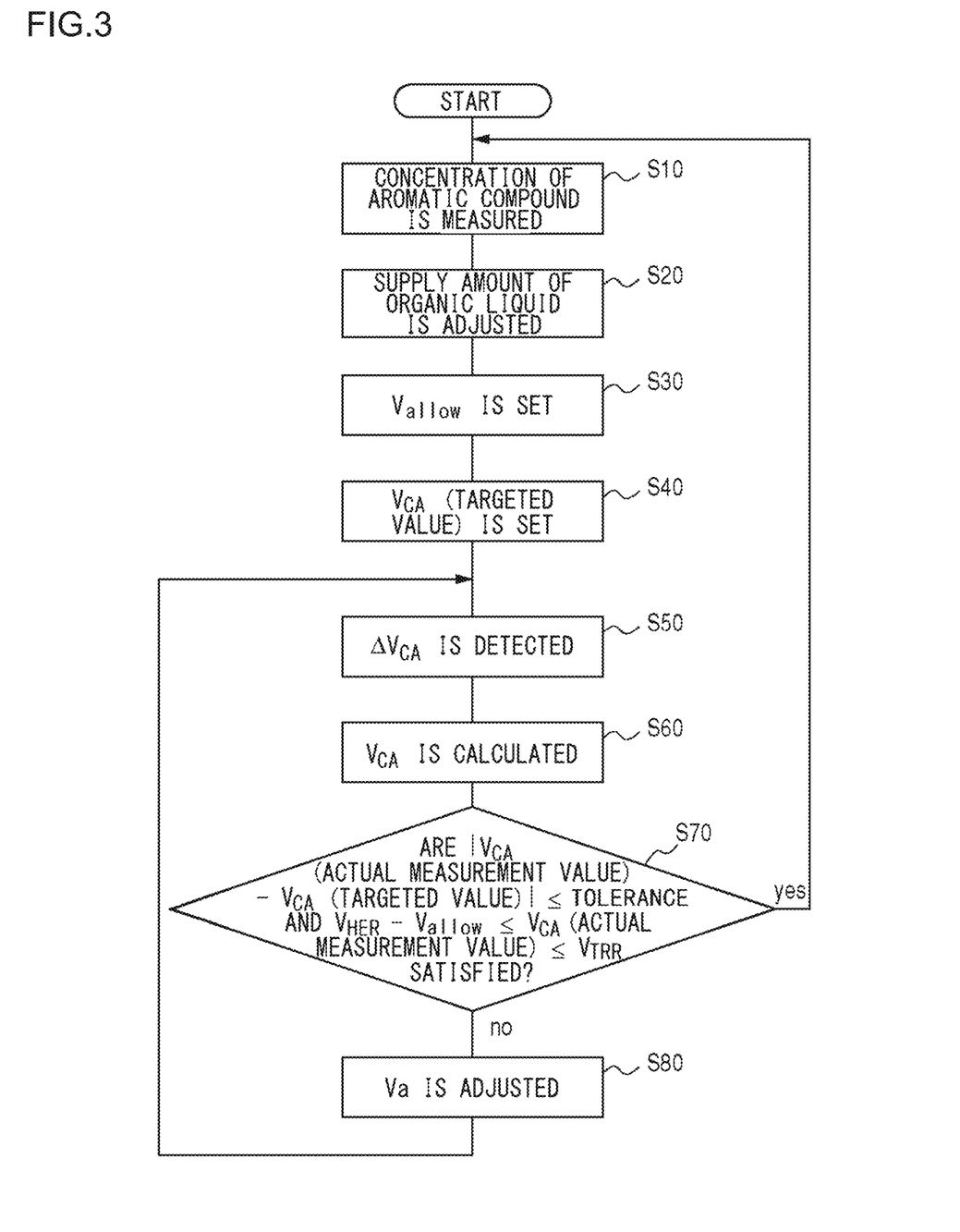
FIG. 3 is a flowchart illustrating an example of potential control of a reduction electrode by a control unit.

FIG. 3 is a flowchart illustrating an example of potential control of the reduction electrode 120 by the control unit 60. The mode of potential control of the reduction electrode 120 will be described below by using, as an example, a case where an Ag/AgCl electrode (reference electrode potential $V_{Ref}$=0.199 V) is used as the reference electrode 112.

First, the concentration measurement unit 34 measures the concentration of the aromatic compound in an organic liquid to be supplied to the reduction electrode 120 (S10). Next, based on the concentration of the aromatic compound measured by the concentration measurement unit 34, the potential difference $V_{allow}$ for setting the lower limit potential is set (S20). In general, as the hydrogenation of at least one benzene ring of the aromatic compound progresses, the concentration of the aromatic compound becomes lower. For this reason, the lower limit potential setting unit 62 increases an absolute value of the potential difference $V_{allow}$ for setting the lower limit potential. For example, the lower limit potential setting unit 62 properly determines the potential difference $V_{allow}$ for setting the lower limit potential according to the concentration of the aromatic compound with reference to the corresponding relation that is stored in advance in a memory such as a ROM between the potential difference $V_{allow}$ for setting the lower limit potential and the concentration of the aromatic compound. The potential $V_{CA}$ (targeted value) is set so as to satisfy $V_{HER}-V_{allow} \le V_{CA} \le V_{TRR}$ using the potential difference $V_{allow}$ for setting the lower limit potential (S30).

Next, the voltage detection unit 114 detects the potential difference $\Delta V_{CA}$ between the reference electrode 112 and the reduction electrode 120 (S40).

Next, the control unit 60 calculates a potential $V_{CA}$ (actual measurement value) of the reduction electrode 120 using (expression) $V_{CA}=\Delta V_{CA}-V_{Ref}=\Delta V_{CA}-0.199$ V (S50).

Next, whether the potential $V_{CA}$ (actual measurement value) satisfies the following expressions (1) and (2) is determined (S60).

$$|\text{Potential } V_{CA} \text{ (actual measurement value)}-\text{Potential } V_{CA} \text{ (targeted value)}| \le \text{Tolerance} \qquad (1)$$

$$V_{HER}-V_{allow} \le V_{CA} \text{ (actual measurement value)} \le V_{TRR} \qquad (2)$$

In the expression (1), the tolerance is, for example, 1 mV.

If the potential $V_{CA}$ (actual measurement value) satisfies the expressions (1) and (2), S60 progresses to "yes" so as to measure the concentration of the aromatic compound again. On the other hand, if the potential $V_{CA}$ (actual measurement value) does not satisfy both the expressions (1) and (2), S60 progresses to "no" so as to adjust the voltage Va applied between the reduction electrode 120 and the oxygen evolving electrode 130 (S70). After adjustment of the voltage Va, the process goes back to the process of (S40) described above.

Here, an example of the adjustment of the potential Va is described. For example, in case of Potential $V_{CA}$ (actual measurement value)−Potential $V_{CA}$ (targeted value)>Tolerance, the control unit 60 sends an instruction to the power control unit 20 so as to increase the voltage Va by only 1 mV. In addition, as a result of increasing the voltage Va, even when |(Potential $V_{CA}$ (actual measurement value)−Potential $V_{CA}$ (targeted value)|≤Tolerance is satisfied, in case of $V_{CA}$ (actual measurement value)<$V_{HER}-V_{allow}$, the expression (2) is not satisfied, and thus in the next process, the control unit 60 allows the voltage Va to decrease by 1 mV.

On the other hand, in case of Potential $V_{CA}$ (actual measurement value)−Potential $V_{CA}$ (targeted value)<−Tolerance, the control unit 60 sends an instruction to the power control unit 20 so as to decrease the voltage Va by only 1 mV. In addition, as a result of decreasing the voltage Va, even when |(Potential $V_{CA}$ (actual measurement value)−Potential $V_{CA}$ (targeted value)|≤Tolerance is satisfied, in case of $V_{CA}$ (actual measurement value)>$V_{TRR}$, the expression (2) is not satisfied, and thus in the next process, the control unit 60 allows the voltage Va to increase by 1 mV. In this way, the control unit 60 adjusts the voltage Va until the voltage Va finally satisfies the expressions (1) and (2).

In addition, the value (adjustment range) for decreasing or increasing the voltage Va is not limited to 1 mV. For example, the adjustment range of the voltage Va may be set to correspond the above-mentioned tolerance in the first round of adjustment of the voltage Va, and the adjustment range of the voltage Va may be set to, for example, one-fourth of the above-described tolerance in the second and subsequent rounds of adjustment of the voltage Va. This allows the potential $V_{CA}$ (actual measurement value) to be quickly adjusted within a range that satisfies the expressions (1) and (2).

According to the electrochemical reduction device 10 as described above, by adjusting the lower limit of the potential $V_{CA}$ according to the concentration of the aromatic compound, especially, decreasing the lower limit of the potential $V_{CA}$ as the concentration of the aromatic compound is decreased, it allows currents to flow as many as possible within the range in which the hydrogenation of at least one benzene ring of the aromatic compound is dominant while maintaining Faraday efficiency high.

Embodiment 2

Figure 4:
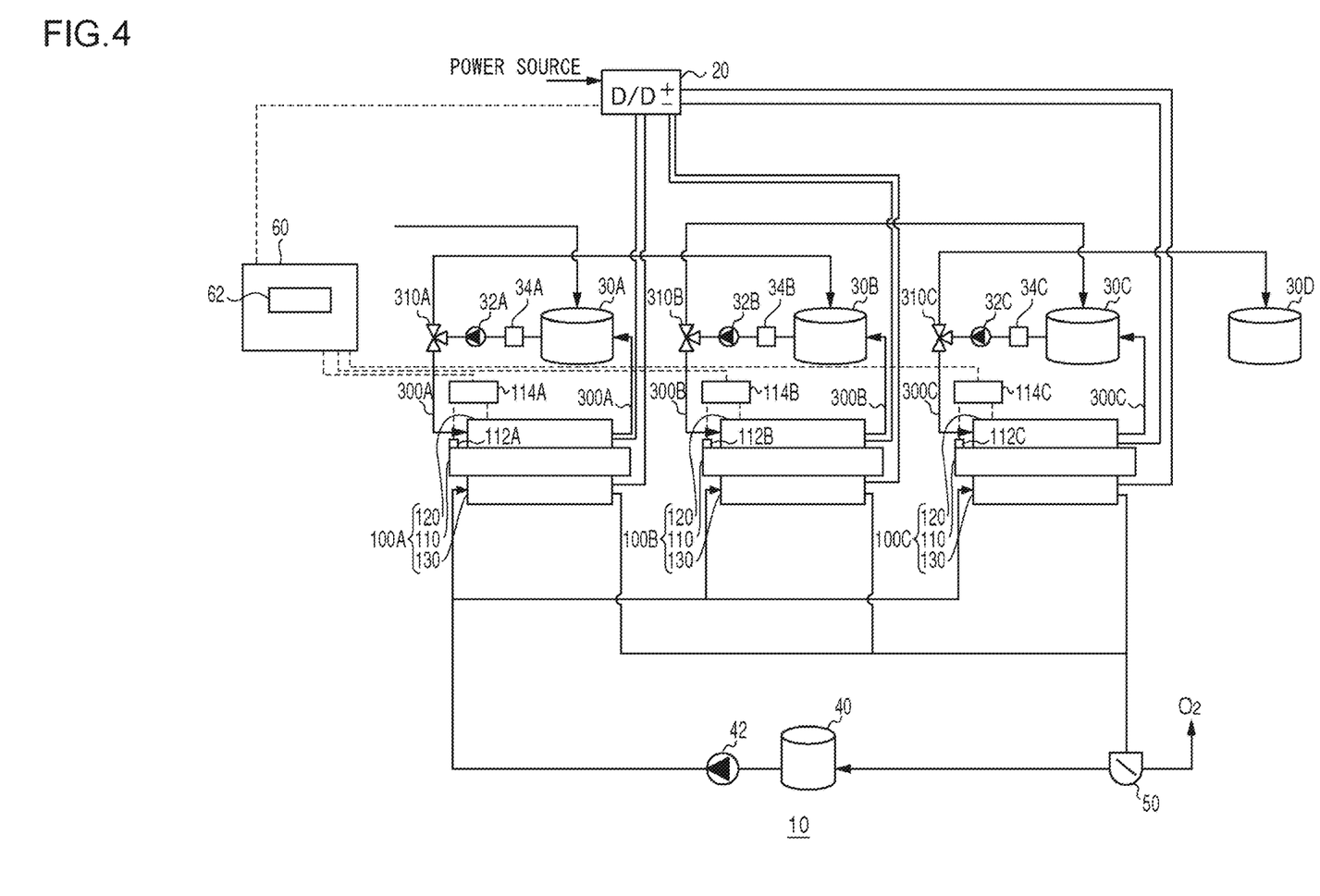
FIG. 4 is a schematic diagram illustrating the general configuration of an electrochemical reduction device according to an embodiment 2.

FIG. 4 is a schematic diagram illustrating the general configuration of an electrochemical reduction device according to an embodiment 2. As illustrated in FIG. 4, the electrochemical reduction device 10 includes electrode units 100A, 100B, and 100C, which are each independent. In the present embodiment, the number N of the electrode units 100 is three, but the number N may be any number as long as it is equal to or more than two. The configuration of each electrode unit 100 is similar to the configuration in the embodiment 1, and the explanation about them will not be appropriately provided. In FIG. 4, the electrode unit 100 is simplified for illustration, and the liquid diffusion layers 140a and 140b and the separators 150a and 150b illustrated in FIG. 2 are not illustrated.

In the present embodiment, the power control unit 20 supplies a voltage Va (A), a voltage Va (B), and a voltage Va (C) each independently between the oxygen evolving electrode 130 and the reduction electrode 120 of each of the electrode units 100. In addition, the lower limit potential setting unit 62 sets a potential difference $V_{allow}$ (A) for setting the lower limit potential, a potential difference $V_{allow}$ (B) for setting the lower limit potential, and a potential difference $V_{allow}$ (C) for setting the lower limit potential, each independently, for the respective electrode units 100. In addition, the reference electrode input terminals of the power control units 20 provided in each of the electrode units 100 are connected to the reference electrode 112A, the reference electrode 112B, and the reference electrode 112C, which are each provided on electrolyte membranes 110 of the respective electrode units 100. The output of the reference electrode input terminal of the power control unit 20 is controlled by the control unit 60 to be desired potentials of the oxygen evolving electrode 130 and the reduction electrode 120 based on the potential of the respective reference electrodes 112.

The circulation pathways 300A, 300B, and 300C via the reduction electrodes 120 of the electrode units 100 and organic material storage tanks are provided at the respective electrode units 100. The circulation pathways 300B and 300C are the same as the circulation pathway 300A, and thus the circulation pathway 300A will be described with illustration below, and descriptions about the circulation pathways 300B and 300C will not be appropriately provided. The circulation pathway 300A is a pipeline for circulating the aromatic compound between the organic material storage tank 30A and the reduction electrode 120 of the electrode unit 100A. A concentration measurement unit 34A, a first liquid supply device 32A, and a three-way valve 310A are provided in order on the downstream side of the organic material storage tank 30A.

The three-way valve 310A can switch between a pathway from the first liquid supply device 32A to the reduction electrode of the electrode unit 100A and a pathway from the first liquid supply device 32A to the organic material storage tank 30B. A three-way valve 310B provided on the circulation pathway 300B can switch between a pathway from the first liquid supply device 32B to the reduction electrode 120 of the electrode unit 100B and a pathway from the first liquid supply device 32B to the organic material storage tank 30C. In addition, a three-way valve 310C provided on the circulation pathway 300C can switch between a pathway from the first liquid supply device 32C to the reduction electrode of the electrode unit 100C and a pathway from the first liquid supply device 32C to the organic material storage tank 30D. The organic material storage tank 30D stores a final product treated by an electrode unit assembly 200. In the present embodiment, the three-way valves 310A to 310C are a solenoid valve controlled by the control unit 60.

A circulation pathway for water is provided between the water storage tank 40 and the oxygen evolving electrode 130 of each electrode unit 100. Water stored in the water storage tank 40 is supplied to the oxygen evolving electrode 130 of each electrode unit 100 by a second liquid supply device 42. Specifically, a pipeline that comprises the circulation pathway for water is branched on the downstream side of the second liquid supply device 42, and distributes and supplies water to the oxygen evolving electrode 130 of each electrode unit 100. In each electrode unit 100, unreacted water merges into the pipeline that communicates with the water storage tank 40, then passes through the pipeline, and is stored in the water storage tank 40.

Like the embodiment 1, a reference electrode 112 is provided on the electrolyte membrane 110 of each electrode unit 100 so as to connect with the electrolyte membrane 110 in an area spaced apart from the reduction electrode 120 and the oxygen evolving electrode 130.

A potential difference $\Delta V_{CA}$ between the reference electrode 112A and the reduction electrode 120 of the electrode unit 100A is detected by a voltage detection unit 114A. The value of the potential difference $\Delta V_{CA}$ detected by the voltage detection unit 114A is input to the control unit 60. The control unit 60 acquires a potential $V_{CA}$ (A) of the reduction electrode 120 of the electrode unit 100A based on a potential $V_{Ref}$ of the reference electrode 112A and the potential difference $\Delta V_{CA}$ detected by the voltage detection unit 114A.

A potential difference $\Delta V_{CA}$ between the reference electrode 112B and the reduction electrode 120 of the electrode unit 100B is detected by a voltage detection unit 114B. The value of the potential difference $\Delta V_{CA}$ detected by the voltage detection unit 114B is input to the control unit 60. The control unit 60 acquires a potential $V_{CA}$ (B) of the reduction electrode 120 of the electrode unit 100B based on a potential $V_{Ref}$ of the reference electrode 112B and the potential difference $\Delta V_{CA}$ detected by the voltage detection unit 114B.

In addition, a potential difference $\Delta V_{CA}$ between the reference electrode 112C and the reduction electrode 120 of the electrode unit 100C is detected by a voltage detection unit 114C. The value of the potential difference $\Delta V_{CA}$ detected by the voltage detection unit 114C is input to the control unit 60. The control unit 60 acquires a potential $V_{CA}$ (C) of the reduction electrode 120 of the electrode unit 100C based on a potential $V_{Ref}$ of the reference electrode 112C and the potential difference $\Delta V_{CA}$ detected by the voltage detection unit 114C.

The benzene ring of the aromatic compound supplied to the organic material storage tank 30A is hydrogenated by the reduction electrode of the electrode unit 100A during being circulated in the circulation pathway 300A by the first liquid supply device 32A, and thus gradually becomes a hydride in which a benzene ring is hydrogenated. Therefore, the concentration of the aromatic compound in an organic liquid including the aromatic compound and the hydride is decreased. The control unit 60 controls the three-way valve 310A such that the organic liquid is circulated in the circulation pathway 300A until the concentration of the aromatic compound measured by the concentration measurement unit 34A becomes a predetermined concentration lower limit value. For example, when the aromatic compound of a 100% concentration is supplied to the first liquid supply device 32A as a raw material, the circulation pathway 300A is formed until the concentration becomes 50%. At this time, the control unit 60 controls the power control unit 20 to be $V_{HER} - V_{allow}(A) \leq V_{CA}(A) \leq V_{TRR}$ with respect to the potential $V_{CA}$ (A) of the reduction electrode of the electrode unit 100A. A control aspect by the control unit 60 is the same as the embodiment 1, and an absolute value of $V_{allow}$ (A) is increased as the concentration of the aromatic compound is decreased.

Next, when the concentration of the aromatic compound measured by the concentration measurement unit 34A reaches a predetermined concentration lower limit value, the control unit 60 controls the three-way valve 310A so as to open a pathway from the first liquid supply device 32A to the organic material storage tank 30B. For this reason, the organic liquid in the circulation pathway 300A is stored in the organic material storage tank 30B.

The benzene ring of the aromatic compound included in the organic liquid supplied to the organic material storage tank 30B is hydrogenated by the reduction electrode of the electrode unit 100B during being circulated in the circulation pathway 300B by the first liquid supply device 32B, and thus the concentration of the aromatic compound in the organic liquid is gradually decreased. The control unit 60 controls the three-way valve 310B such that the organic liquid is circulated in the circulation pathway 300B until the concentration of the aromatic compound measured by the concentration measurement unit 34B becomes a predetermined concentration lower limit value. For example, when the aromatic compound of a 50% concentration is supplied to the first liquid supply device 32B, the circulation pathway 300B is formed until the concentration becomes 20%. At this time, the control unit 60 controls the power control unit 20 to be $V_{HER} - V_{allow}(B) \leq V_{CA}(B) \leq V_{TRR}$ with respect to the potential $V_{CA}$ (B) of the reduction electrode of the electrode unit 100B. A control aspect by the control unit 60 is the same as the embodiment 1, and an absolute value of $V_{allow}$ (B) is increased as the concentration of the aromatic compound is decreased.

Next, when the concentration of the aromatic compound measured by the concentration measurement unit 34B reaches a predetermined concentration lower limit value, the control unit 60 controls the three-way valve 310B so as to open a pathway from the first liquid supply device 32B to the organic material storage tank 30C. For this reason, the organic liquid in the circulation pathway 300B is stored in the organic material storage tank 30C.

The benzene ring of the aromatic compound included in the organic liquid supplied to the organic material storage tank 30C is hydrogenated by the reduction electrode of the electrode unit 100C during being circulated in the circulation pathway 300C by the first liquid supply device 32C, and thus the concentration of the aromatic compound in the organic liquid is gradually decreased. The control unit 60 controls the three-way valve 310C such that the organic liquid is circulated in the circulation pathway 300C until the concentration of the aromatic compound measured by the concentration measurement unit 34C becomes a predetermined concentration lower limit value. For example, when the aromatic compound of a 20% concentration is supplied to the first liquid supply device 32C, the circulation pathway 300C is formed until the concentration becomes 5%. At this time, the control unit 60 controls the power control unit 20 to be $V_{HER}-V_{allow}(C) \leq V_{CA}(C) \leq V_{TRR}$ with respect to the potential $V_{CA}$ (C) of the reduction electrode of the electrode unit 100C. A control aspect by the control unit 60 is the same as the embodiment 1, and an absolute value of $V_{allow}$ (C) is increased as the concentration of the aromatic compound is decreased.

Next, when the concentration of the aromatic compound measured by the concentration measurement unit 34C reaches a predetermined concentration lower limit value, the control unit 60 controls the three-way valve 310C so as to open a pathway from the first liquid supply device 32C to the organic material storage tank 30D. For this reason, the organic liquid in the circulation pathway 300C is stored in the organic material storage tank 30D. In this way, the benzene ring of the aromatic compound that is supplied as a raw material is hydrogenated by passing through the reduction electrode of the electrode unit 100A, the reduction electrode of the electrode unit 100B, and the reduction electrode of the electrode unit 100C in order, and then stored in the organic material storage tank 30D.

In addition, the control unit 60 controls the power control unit 20 so as to satisfy $Va \geq (V_{OER}-V_{CA})$ with respect to each electrode unit 100. For this reason, in each electrode unit 100, the potential $V_{AN}$ is held to be equal to or higher than the oxygen evolving equilibrium potential $V_{OER}$.

According to the electrochemical reduction device 10 as described above, while increasing Faraday efficiency in the electrode unit, the hydrogenations of at least one benzene ring of the aromatic compounds having different concentrations can be performed in the electrode unit 100A, the electrode unit 100B, and the electrode unit 100C at the same time. Therefore, as compared with the case of performing hydrogenation of at least one benzene ring of the aromatic compound using single electrode unit, it is possible to largely increase the amount of the aromatic compounds that can be treated per unit time.

The present invention is not limited to the above-mentioned embodiments, and various modifications, such as a design change, can be added thereto based on knowledge of those skilled in the art, and any embodiment to which such modifications are added can also be included in the scope of the present invention.

In the above-described embodiments, the reduction electrode 120 contains an ionomer having protonic conductivity, but the reduction electrode 120 may contain an ionomer having hydroxy ion conductivity.

In addition, in the above-described embodiment 2, the three-way valves 310A to 310C switch between the circulation pathways for the electrode units 100A to 100C and a supply pathway into the electrode unit 100 of the downstream side, but as the concentration of the aromatic compound measured by each concentration measurement unit 34 is made close to the concentration lower limit value set to each electrode unit 100, the opening of each three-way valve 310 may be adjusted such that the distribution of the supply pathway into the electrode unit 100 of the downstream side becomes larger as compared with the distribution of the circulation pathway.

In addition, the circulation pathway of water described in the above-described embodiment 2 is formed in a parallel-type pathway to distribute from the water storage tank 40 to each electrode unit 100, but may be formed in a straightway-type pathway in which water supplied from the water storage tank 40 passes through the oxygen evolving electrodes 130 of the electrode units 100A to 100C in order.

The invention claimed is:
1. An electrochemical reduction device comprising:
   an electrode unit configured to include an electrolyte membrane having ionic conductivity, a reduction electrode that is provided on one side of the electrolyte membrane and that contains a reduction catalyst for hydrogenating at least one benzene ring of an aromatic compound, and an oxygen evolving electrode that is provided on the other side of the electrolyte membrane;
   a power control device configured to apply a voltage Va between the reduction electrode and the oxygen evolving electrode;
   an organic material storage tank configured to store an organic liquid including the aromatic compound;
   a first pathway configured to supply the organic liquid stored in the organic material storage tank and including the aromatic compound to the reduction electrode and a second pathway configured to supply the organic liquid including the aromatic compound that is nucleus-hydrogenated by the reduction electrode and an unreacted aromatic compound to the organic material storage tank;
   a concentration measurement device configured to measure a concentration of the aromatic compound to be supplied to the reduction electrode, the concentration measurement device being provided in the first pathway;
   a control device configured to control the power control device so as to satisfy a relation of $V_{HER}-V_{allow} \leq V_{CA} \leq V_{TRR}$ when a potential at a reversible hydrogen electrode, a standard redox potential of the aromatic compound, a potential of the reduction electrode, and a potential difference for setting a lower limit potential used for determining a lower limit acceptable potential of the potential $V_{CA}$ are expressed as $V_{HER}$, $V_{TRR}$, $V_{CA}$, and $V_{allow}$, respectively; and
   a lower limit potential setting device configured to determine a lower limit of the potential $V_{CA}$ by adjusting the potential difference $V_{allow}$ for setting the lower limit potential according to the concentration of the aromatic compound measured by the concentration measurement device,
   wherein the oxygen evolving electrode includes a substrate composed of a first metal material and a catalyst coating the substrate and composed of a second metal material.

2. The electrochemical reduction device according to claim 1, wherein the lower limit potential setting device increases an absolute value of the potential difference $V_{allow}$ for setting the lower limit potential when the concentration of the aromatic compound is decreased.

3. The electrochemical reduction device according to claim 1, the electrochemical reduction device further comprising:
a reference electrode that is arranged to be in contact with the electrolyte membrane and to be electrically isolated from the reduction electrode and the oxygen evolving electrode and that is held at a reference electrode potential $V_{Ref}$; and
a voltage detector that detects a potential difference $\Delta V_{CA}$ between the reference electrode and the reduction electrode, wherein
the control device acquires the potential $V_{CA}$ of the reduction electrode based on the potential difference $\Delta V_{CA}$ and the reference electrode potential $V_{Ref}$.

4. The electrochemical reduction device according to claim 3, wherein the control device changes the voltage Va, and controls the potential $V_{CA}$ of the reduction electrode to be the potential in a predetermined range.

5. The electrochemical reduction device according to claim 4, wherein the control device controls the power control unit so as to satisfy $Va \geq (V_{OER} - V_{CA})$ when an oxygen evolving equilibrium potential in an electrolysis of water is expressed as $V_{OER}$.

6. The electrochemical reduction device according to claim 3, wherein the reference electrode is arranged on a side that is provided with the reduction electrode on the electrolyte membrane.

7. The electrochemical reduction device according to claim 1, wherein the reduction catalyst comprises a catalyst metal containing at least one of Pt and Pd.

8. The electrochemical reduction device according to claim 1, wherein
the reduction electrode is composed of a metal composition which contains a first catalyst metal containing at least one of Pt and Pd, and at least one second catalyst metal selected from the group consisting of Cr, Mn, Fe, Co, Ni, Cu, Zn, Mo, Ru, Sn, W, Re, Pb, and Bi.

9. The electrochemical reduction device according to claim 8, wherein
a form of the metal composition is an alloy of the first catalyst metal and the second catalyst metal, or an intermetallic compound composed of the first catalyst metal and the second catalyst metal.

10. The electrochemical reduction device according to claim 8, wherein
a ratio of the first catalyst metal to a total mass of the first catalyst metal and the second catalyst metal is 10 to 95 wt %.

11. The electrochemical reduction device according to claim 8, wherein
a ratio of the first catalyst metal to a total mass of the first catalyst metal and the second catalyst metal is 20 to 90 wt %.

12. The electrochemical reduction device according to claim 8, wherein
a ratio of the first catalyst metal to a total mass of the first catalyst metal and the second catalyst metal is 25 to 80 wt %.

* * * * *